(12) United States Patent
Foti (10) Patent No.: US 8,077,615 B2
(45) Date of Patent: Dec. 13, 2011

(54) MULTICAST ADMISSION CONTROL

(75) Inventor: George Foti, Dollard des Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 867 days.

(21) Appl. No.: 11/931,877

(22) Filed: Oct. 31, 2007

(65) Prior Publication Data

US 2009/0113508 A1    Apr. 30, 2009

(51) Int. Cl.
 *H04L 12/26*    (2006.01)
(52) U.S. Cl. .................. 370/230.1; 370/235; 370/390
(58) Field of Classification Search .............. 370/230, 370/229, 230.1, 231, 235, 389, 390
See application file for complete search history.

(56) References Cited

U.S. PATENT DOCUMENTS

| | | | |
|---|---|---|---|
| 6,215,768 B1* | 4/2001 | Kim ............................. | 370/230 |
| 6,628,612 B1* | 9/2003 | Sabry et al. ................... | 370/230 |
| 6,778,531 B1* | 8/2004 | Kodialam et al. ............. | 370/390 |
| 7,245,614 B1* | 7/2007 | Podar et al. ................... | 370/389 |
| 7,792,020 B2 | 9/2010 | Zhao ............................ | 370/228 |
| 2006/0187950 A1* | 8/2006 | Bou-Diab et al. ............ | 370/432 |
| 2006/0221859 A1* | 10/2006 | Bijwaard et al. ............. | 370/254 |
| 2007/0147292 A1 | 6/2007 | Van Ewijk et al. | |
| 2007/0280232 A1* | 12/2007 | Dec et al. ..................... | 370/390 |

FOREIGN PATENT DOCUMENTS

EP    1553737 B1    3/2007
WO    WO 2007073249 A1 *    6/2007

OTHER PUBLICATIONS

W. Fenner, Internet Group Management Protocol, Version 2, Network Working Group, RFC 2236, Nov. 1997.
Cisco Systems, White Paper, Integrated Video Admission Control for the Delivery of a Quality Video Experience, 2006.
Cisco Systems, Optimizing Video Transport in Your IP Triple Play Network, 2006.

* cited by examiner

*Primary Examiner* — Luat Phung
(74) *Attorney, Agent, or Firm* — David Rahmer; Ericsson Canada Inc.

(57) ABSTRACT

A resource admission control entity and method in an administrative domain (AD). The AD has a topology view that comprises link capacity and link usage information. The resource admission control entity receives a request intended for a user to obtain a multicast content, derives a list of links to be newly used by the multicast content based on the request and verifies if the multicast content can be admitted on the links to be newly used by the multicast content based on the topology view thereby providing an admittance verification result. If the admittance verification result is positive, the admission control module updates usage values in the topology view for the links to be newly used by the multicast content.

11 Claims, 6 Drawing Sheets

MULTICAST ADMISSION CONTROL

TECHNICAL FIELD

The present invention relates to content admission control and, more specifically, to admission control in an administrative domain of multicast content.

BACKGROUND

The television broadcasting industry is under transformation. One of the agents of change is television transmission over Internet Protocol (IPTV). In IPTV, a television viewer receives only selected content. The playback of IPTV requires either a personal computer or a "set-top box" (STB) connected to an image projection device (e.g., computer screen, television set). Video content is typically an MPEG2 or MPEG4 data stream delivered via IP Multicast, a method in which information can be sent to multiple computers when these computers join the IP multicast address to which the selected content is being sent. IP multicast is based on Internet Group Management Protocol (IGMP) described in RFC 2236 and its successor for version 3. In comparison, in legacy over the air television broadcasting, a user receives all broadcast content and selects one via a local tuner. Television broadcasting over cable and over satellite follows the same general principle using a wider bandwidth providing for a larger choice of channels.

In IPTV, the content selection of live content is made by registering an address of the viewer to a multicast group using standardized protocols (e.g., IGMP version 2). Live content include the typical over the air, cable or satellite content. Quality of Service (QoS) of the IPTV contents is guaranteed. As such, new content should be delivered to a requesting viewer (or admitted in the transit and access networks) only if it does not affect content being currently delivered to other users through the above networks.

A problem occurs since the usual admission control mechanisms are based on unicast contents, which present linear resource use in a network (i.e., all links between the source and the destination equally affected). Multicast, on the other hand, is replicated by intermediate routers on a need basis (i.e., presence of a consumer of the content on a downlink path). This creates a multicast distribution tree that optimizes resource use. Current admission control mechanisms fail to properly take into consideration multicast optimization.

The problem described in terms of IPTV in the preceding lines is also present in other technologies where a data feed is to be distributed via multicast. For instance, similarities may be readily observed with other TV or audio contents such as Mobile TV, High Definition Digital content, Digital Video Broadcasting Handheld (DVBH), various radio streaming, MP3 streams, private or public surveillance systems streams (audio or video or audio-video), etc. Some other examples also include a given file in high demand (new software release, software update, new pricing list, new virus definition, new spam definition, etc.). There could also be other examples of situation in which a similar problem occurs.

A further problem of current admission control mechanisms is limited scalability. When a stream traverses many administrative domains, its admission control in one of all traversed administrative domains does not guarantee overall admission control.

As can be appreciated, it would advantageous to be able to properly handle multicast admission control and to further support scalability or at least does not limit scalability as much as current situations. The present invention aims at providing at least a portion of the solution to the problem.

SUMMARY

A first aspect of the present invention relates to a resource admission control entity in an administrative domain (AD). The AD has a topology view that comprises link capacity and link usage information. The resource admission control entity comprises an admission control module that receives a request intended for a user to obtain a multicast content, derives a list of links to be newly used by the multicast content based on the request and verifies if the multicast content can be admitted on the links to be newly used by the multicast content based on the topology view thereby providing an admittance verification result. If the admittance verification result is positive, the admission control module updates usage values in the topology view for the links to be newly used by the multicast content.

The admission control module may also send a reply to the request based on the admittance verification result. Optionally, if the admittance verification result is negative, the admission control module avoids modification to the usage values in the topology view.

A second aspect of the invention relates to a method for admitting transition of a multicast content in an administrative domain (AD). The method comprises, in a resource admission control entity for the AD, receiving a request intended for a user to obtain the multicast content and deriving a list of links to be newly used by the multicast content. The method then follows with verifying if the multicast content can be admitted on the links to be newly used by the multicast content based on an AD's topology view thereby providing an admittance verification result. The topology view comprises link capacity and link usage information. If the admittance verification result is positive, then the method continues with updating usage values in the topology view for the links to be newly used by the multicast content.

Optionally, the method may comprise a step of, from the resource admission control entity, sending a reply to the request based on the admittance verification result.

The step of receiving the request may optionally be performed by receiving the request from an Edge Router (ER) of the AD. The request could comprise the list of links to be newly used in the AD to transit the multicast content. In such a case, the step of deriving a list of links to be newly used by the multicast content would further comprise obtaining the list by reading the list in the request.

The step of receiving the request may yet optionally be performed by receiving the request from an Access Node (AN) of the AD. In such a case, the step of deriving the list of links to be newly used by the multicast content would further comprise computing a point of replication of the multicast content based on the topology view thereby obtaining the list.

Yet another option is that the method further comprises a step of verifying if a reservation exists for the user in the AD thereby providing a reservation verification result.

BRIEF DESCRIPTION OF THE DRAWINGS

A more complete understanding of the present invention may be gained by reference to the following 'Detailed description' when taken in conjunction with the accompanying drawings wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

The present invention relates to a resource admission control mechanism that takes into account the multicast nature of contents and provides enhanced scalability compared to existing solutions. The mechanism involves one topology view per administrative domain (AD). The topology view shows links in the AD that can be used to transit contents. For each link mentioned in the topology view, remaining capacity information or link capacity and link usage is also included. Furthermore, the topology view includes necessary information to identify where contents could be available for replication. The necessary information could take the form, for instance, of a multicast tree structure or a list of contents currently transiting in the AD. An assumption made in order for the mechanism to work consistently is that the topology view can be properly updated within the AD following various events (link failure, router failure, capacity modification, etc.). This can be done, for instance, via a dynamic topology discovery protocol that propagate configuration information for the topology view or via a graphical user interface that enables proper update of the topology view Another assumption is that the topology view is accessible (read-write) to a resource admission control entity that receives admission control request in the AD (all or a portion thereof as long as the topology view is updated).

On a high level, the invention consists of taking a centralized admission control decision per Administrative domain in a resource admission control entity. Decisions are taken in each administrative domain and, as such, each resource admission control entity takes its decision based on its local topology view (i.e., being informed of the source and destination of the content in its Administrative domain). The resource admission control entity takes advantage of the multicast nature of contents to evaluate their impact on the Administrative domain before admitting a new request for a content. In one aspect of the invention, the resource admission control entity receives the request and predicts the replication node of the content based on the request and the topology view. Based on the identity of the replication node, the resource admission control entity derives links to be newly used by the requested content before deciding on admittance of the content related to the request. If the content is admitted, the topology view is updated (i.e., update the link usage for each link newly affected by the content's delivery). In another aspect of the invention, the resource admission control entity receives the request, which already comprises a list of nodes to be traversed by the to-be-admitted content (or necessary information to obtain such a list). Based on the list of links, the resource admission control entity decides on admittance of the content related to the request. If the content is admitted, the topology view is updated (i.e., update the link usage for each link newly affected by the content's delivery).

Figure 1:
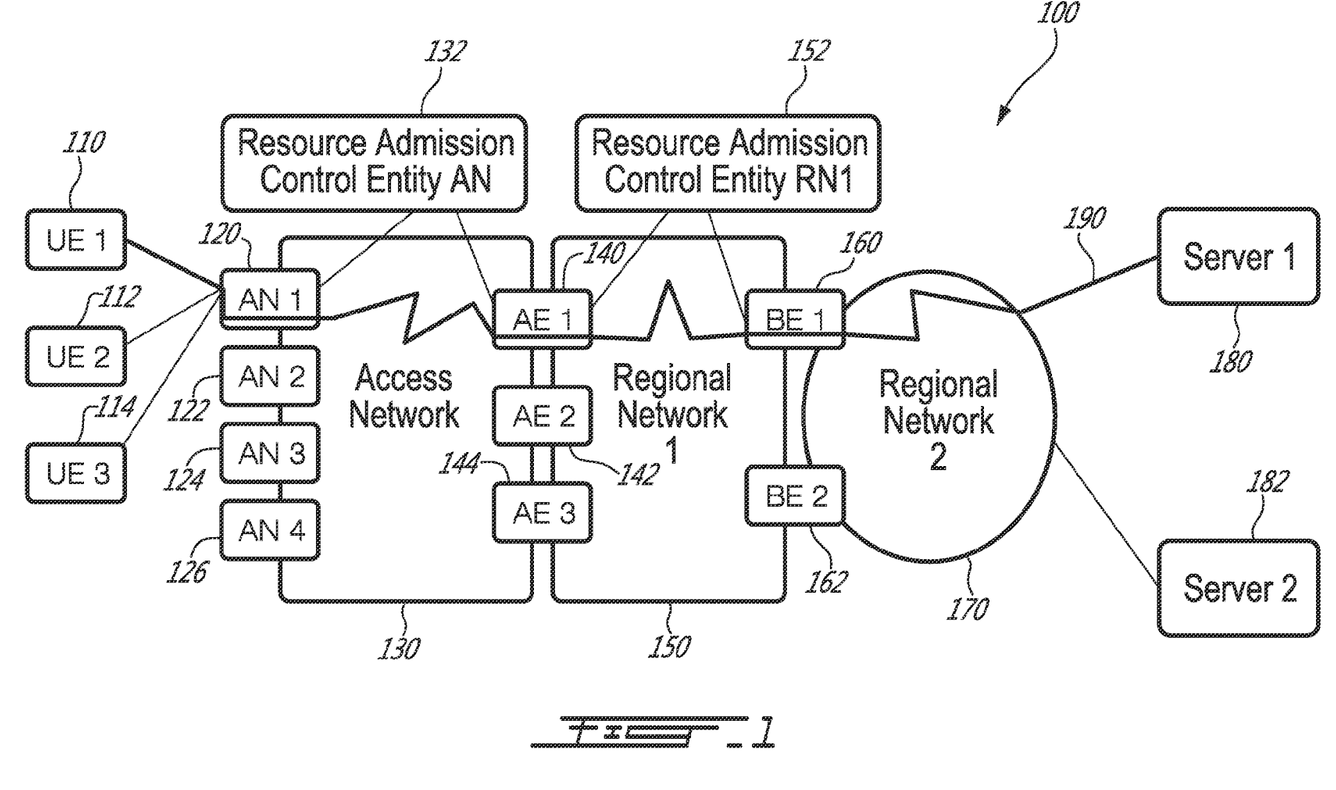
FIG. 1 is an exemplary architectural view of a network in accordance with the teachings of the present invention.

Reference is now made to the drawings in which FIG. 1 shows an exemplary architectural and logical view of a network 100 in accordance with the teachings of the present invention. In the network 100, multiple User Equipments (UE) (UE 1 110, UE 2 112 and UE 3 114) are shown connected to one of a plurality of Access Nodes (AN) (AN 1 120, AN 2 122, AN 3 124 and AN 4 126). The UEs and ANs form what is sometimes referred to as the last mile. The ANs are the entry point to the access network 130. A Resource Admission Control Entity (RACE) 132 of the access network 130 is also shown. The Resource Admission Control Entity 132 is shown outside the access network 130. It should be understood that the Resource Admission Control Entity 132 could also be located within the access network 130. Furthermore, the Resource Admission Control Entity 132 could be a logical function located within another node of the network 100 as long as it can reach and can be reached by the relevant nodes (as is explicated in the next paragraphs).

An example of a Resource Admission Control Entity is an Access Resource and Admission Control Function (A-RACF) which is the functional entity of the Resource Admission Control Subsystem (RACS) and specified within the Telecoms & Internet converged Services and Protocols for Advanced Networks (TISPAN) standards, however it will be appreciated by those skilled in the art that other types of resource management entities can be used in conjunction with exemplary embodiments.

The access network 130 further comprises access edge nodes (AE) (AE 1 140, AE 2 142 and AE 3 144) that are interfacing the access network 130 with a regional network 1 150. The access network 130 further comprises intermediate nodes (e.g., layer 2) or intermediate routers (not shown). The Resource Admission Control Entity 132 needs to have access to a topology view (not shown) of the access network 130. The topology view contains link capacity information, e.g., remaining capacity or link usage and link capacity. The link capacity information needs to be maintained up-to-date for each link under the authority of the Resource Admission Control Entity 132, i.e., each link between the AEs and the ANs passing through the intermediate routes that are managed by the Resource Admission Control Entity 132. Furthermore, the topology view includes necessary information to identify where contents could be available for replication (e.g., a multicast tree structure) in the access network 130. Note that, in the example currently discussed, the Resource Admission Control Entity 132 is likely aware of the bandwidth available in the last mile as the access network 130 would, in typical implementation, also includes control of the last mile's resources. As such, reservations against the last mile for any type of session would likely go through the Resource Admission Control Entity 132, even though this does not affect the teachings of the present invention.

The regional network 1 150 comprises Border edge nodes (BE) (BE 1 160 and BE 2 162) that are interfacing the regional network 1 150 with a regional network 2 170. A Resource Admission Control Entity 152 of the regional network 1 150 is also shown. The regional network 1 150 further comprises intermediate nodes (e.g., layer 2) or intermediate routers (not shown). The Resource Admission Control Entity 152 needs to have access to a topology view (not shown) of the regional network 1 150. The topology view contains link capacity information, e.g., remaining capacity or link usage and link capacity. The link capacity information needs to be maintained up-to-date for each link under the authority of the Resource Admission Control Entity 152, i.e., each link between the BEs and the AEs passing through the intermediate routes that are managed by the Resource Admission Control Entity 152. In comparison to the access network 130, the regional network 1 150. Furthermore, the topology view includes necessary information to identify where contents could be available for replication (e.g., a multicast tree structure) within the regional network.

The regional network 2 170 is shown connected to a server 1 180 and a server 2 182. These servers are shown as exemplary sources of multicast content. Their location outside of the regional network 2 170 is meant for illustration is likely represent a typical situation. However, servers could be located in any of the network 100, 130, 150 or 170. The regional network 2 170 further comprises intermediate nodes (e.g., layer 2) or intermediate routers (not shown).

It should be understood that the number of devices (AN, UE, BE, Server, etc.) shown on FIG. 1 is for illustrative purpose only. More or fewer of each device may exist in actual implementations. A single network (e.g., 130) could also be present. Similarly, more than one Resource Admission Control Entity is shown in the network 100. While a single Resource Admission Control Entity could control more than one network, the 130 and 150 networks could be differently managed (e.g., different owner, different equipments/protocols, etc.). The present invention is meant to support one Resource Admission Control Entity per network in which a topology view exists with updated resource availability information. In some circumstances, more than one Resource Admission Control Entity could be present in a single network. This is workable as long as a single updated topology view is shared or if a subset of shared resources, for which a topology view exists, is managed by a single Resource Admission Control Entity.

FIG. 1 also shows a content delivery (or session) 190 between the server 1 180 and the UE 1 110. The content delivery is shown traversing the regional network 2 170 via its intermediates nodes towards the BE 1 160. The content delivery then transits through the regional network 1 150 via its intermediates nodes towards the AE 1 140. Similarly, the content delivery transits through the access network 130 via its intermediates nodes towards the AN 1 120 before reaching the UE 1 110.

Figure 2:
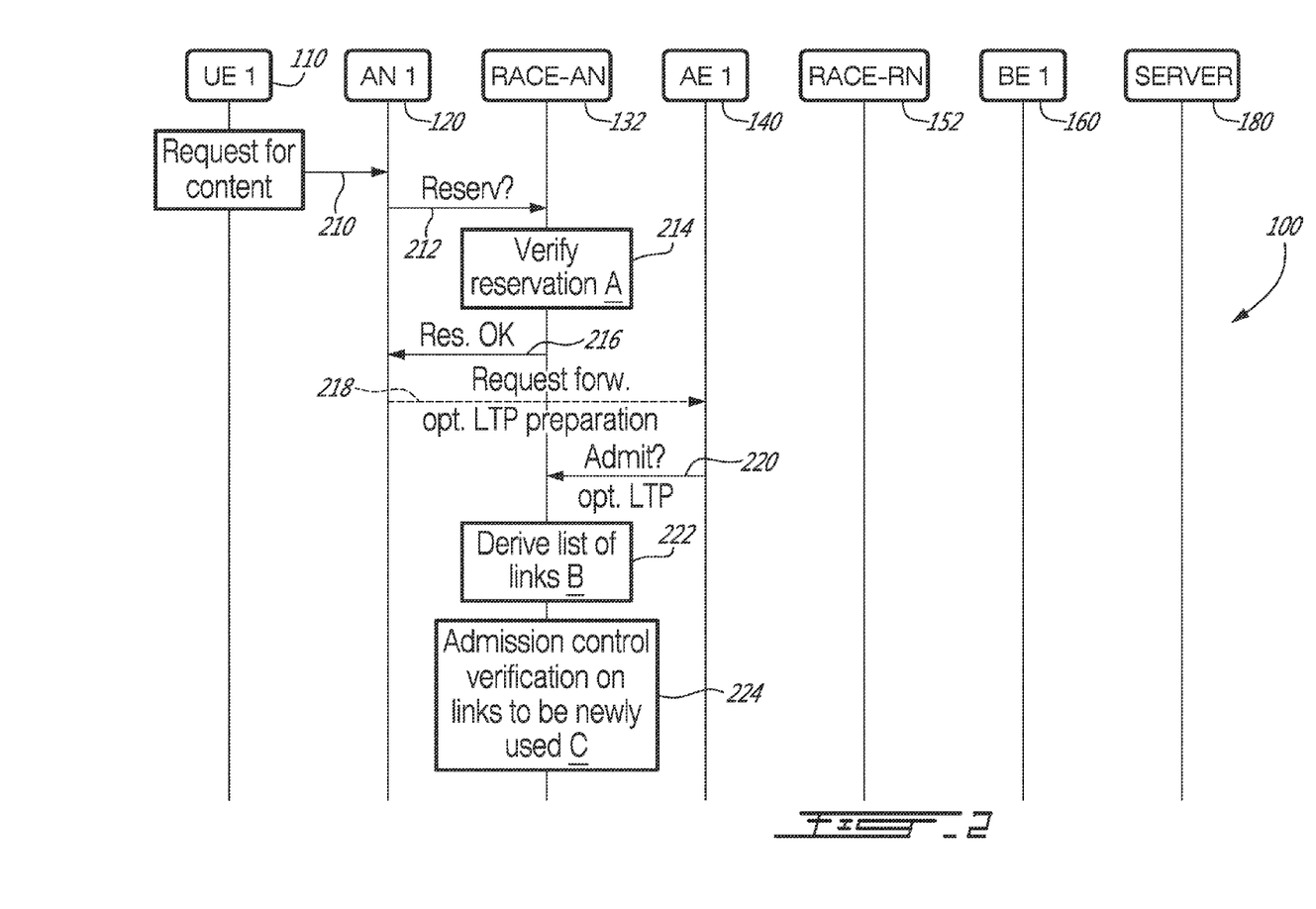
FIG. 2 is an exemplary signal flow and node operation chart of content delivery admittance in accordance with the teachings of the present invention.

FIG. 2 is an exemplary signal flow and node operation chart in accordance with the teachings of the present invention. It shows how the present invention enhances admittance of the content delivery 190 in view of the resources managed in the 130 and 150 networks by the Resource Admission Control Entities 132 and 152. As mentioned earlier, the Resource Admission Control Entities 132 and 152 need to have access to an updated topology view of their respective network (not shown on FIG. 2).

The AN 1 120 first receives a request 210 for content delivery from the UE 1 110. The request 210 itself can be of different nature as long as it properly describes the content to be delivered in a format that can be understood by the AN 1 120 (e.g., source, destination, QoS requirement (e.g., delay, bandwidth, etc.—explicit or implicit), etc.). An example of request is an Internet Group Management Protocol (IJMP) join request which comprises the multicast address the UE 1 110 wants to join. Upon reception of the request 210, the AN 1 120 verifies if a reservation exists in the last mile. For that purpose, the AN 1 120 may communicate with the Resource Admission Control Entity 132 (shown as RACE-AN) to obtain a confirmation of the reservation, as shown on FIG. 2. The AN 1 120, in such a case, sends a reservation verification message 212. The Resource Admission Control Entity 132 verifies 214 (step A) that a reservation exists for the UE 1 110. If a reservation exists, it replies with a reservation OK message 216 towards the AN 1 120.

If the AN 1 120 is already delivering the requested content (e.g., to at least another UE), then the requested content is likely to be sent to the UE 1110 upon receipt of message 216. On the other hand, if the requested content is not available at the AN 1 120, then the AN 1 120 in the reservation verification message 212 could also optionally request the Resource Admission Control Entity 132 to verify if the requested content would be available in the access network 130. As such, the Resource Admission Control Entity 132, during the step A 214, may also verify if the content of the request 210 is currently being delivered in the access network 130 at an intermediate node by analyzing the topology view of the access network 130. The delivery verification could be triggered by the reservation verification message 212 or be initiated by the Resource Admission Control Entity 132. If the content is currently being delivered in the access network 130 (i.e., at some intermediate node), the Resource Admission Control Entity 132 may perform, as needed, steps B-D (shown below) before replying to the reservation verification message 212. The steps B-B, as will be shown later, ensure that the content is properly admitted before a reply is sent to the request.

The AN 1 120, upon confirmation that the UE 1 110 can receive a content transiting in the access network 130, forwards 218 the request 210 upstream (in accordance with prior art solutions). Each intermediate node (not shown) that treats the request 210 may add a trace in the request. The trace, which could be called Link Trace Path or LTP, contains necessary information to identify the links used by the request 210. For instance, the trace may contain the identity (e.g., layer 2 or layer 3 address, unique identifier, etc.) of the node that received the request 210, the identity of the node from which the request 210 was received or the identity of the link on which the request 210 transited or is about to transit. The request 210 is then forwarded 218, potentially with the trace, upstream in accordance with prior art solutions.

Upon reception of the request 210, the AE 1 140 sends an admittance verification message 220 to the Resource Admission Control Entity 132. The admittance verification message 220 comprises an identification of the content to be delivered and of the delivery point thereof (i.e., in the present example, the UE 1 110). The admittance verification message 220 may also comprise the trace, if it was built previously and included in the request 210. Upon reception of the admittance verification message 220, the Resource Admission Control Entity 132 derives a list of links 222 (step B) to be newly used by the content of the request 210 for the intended delivery to the UE 110. The step B 222 may consist of analyzing the trace comprised in the admittance verification message 220. The Resource Admission Control Entity 132 may further perform the step B 222 by analyzing its topology view of the access network 130 (e.g., simulating a route request in the topology view of the access network 130).

The links to be newly used by the content are not necessarily the same links as the complete list of links to be used for delivery of the content. In fact, the content may already be under delivery in the access network 130 (as discussed earlier). In such a case, the Resource Admission Control Entity 132 is capable of deriving the list of links 222 from the topology view by determining the replication point (not shown) of the content in the access network 130 (e.g., by analyzing the multicast tree structure of the access network 130 or the list of contents being delivered therein).

The Resource Admission Control Entity 132 then proceeds with an admittance verification of the content on each of the links to be newly used thereby 224 (step C). The verification is based on link remaining capacity (or, alternatively, link usage and capacity (explicit or implicit)) maintained in the topology view. If the admittance verification result is positive, the Resource Admission Control Entity 132 updates the topology view 226 (step D) before sending a positive admittance verification result message 228 to the AE 1 140.

If the Resource Admission Control Entity 132 has identified the replication point of the content in the access network 130 and is performing steps B-D in the context of the reservation verification (the step A 214), the reservation OK message 216, in such a case, would comprise a positive admittance verification result towards the AN 1 120. Furthermore, in this case, messages 220 and 228 would not be necessary and the delivery would begin shortly after reception of the request 210, as forwarded in 218, at the replication point in the access network 130.

The AE 1 140, upon reception of the positive admission result message 228, acts as an access node for the regional network 1 150 in cooperation with the Resource Admission Control Entity 152 (shown RACE-RN1 on FIG. 2). However, if the AE1 140 is already delivering the requested content (e.g., to another network (not shown)), then the delivery is likely to start immediately towards the access network 130. The AE 1 140 performs similar to those performed by the AN 1 120 upon reception of the request 210 from the UE 1 110. Similarly, the BE 1 160 performs, for the regional network 1 150, similar steps as the ones performed by the AE 1 140 for the access network 130 (again, in all likelihood, in case the requested content is not currently being delivered by the BE1 160). This is represented by the steps and messages 230 to 248 on FIG. 2.

Upon reception of the positive admittance result message 248, the BE 1 160 forwards the request 210 upstream in accordance with prior art solutions. Upon reception of the request 210, the server 1 180 proceeds, in accordance with prior art solutions, to the delivery of the requested content. It should be noted that other verifications not mentioned in the context of the present invention could be necessary in various nodes of the network (e.g., content on white access list or not on black list, payment verification, UE capacity verification, etc.) without affecting the logic of the present invention. In case of negative verification due to the present invention (e.g., steps 214, 224, 234, 244), the topology views are left unaffected and the UE 1 110 is informed of the negative outcome, if possible.

Figure 3A:
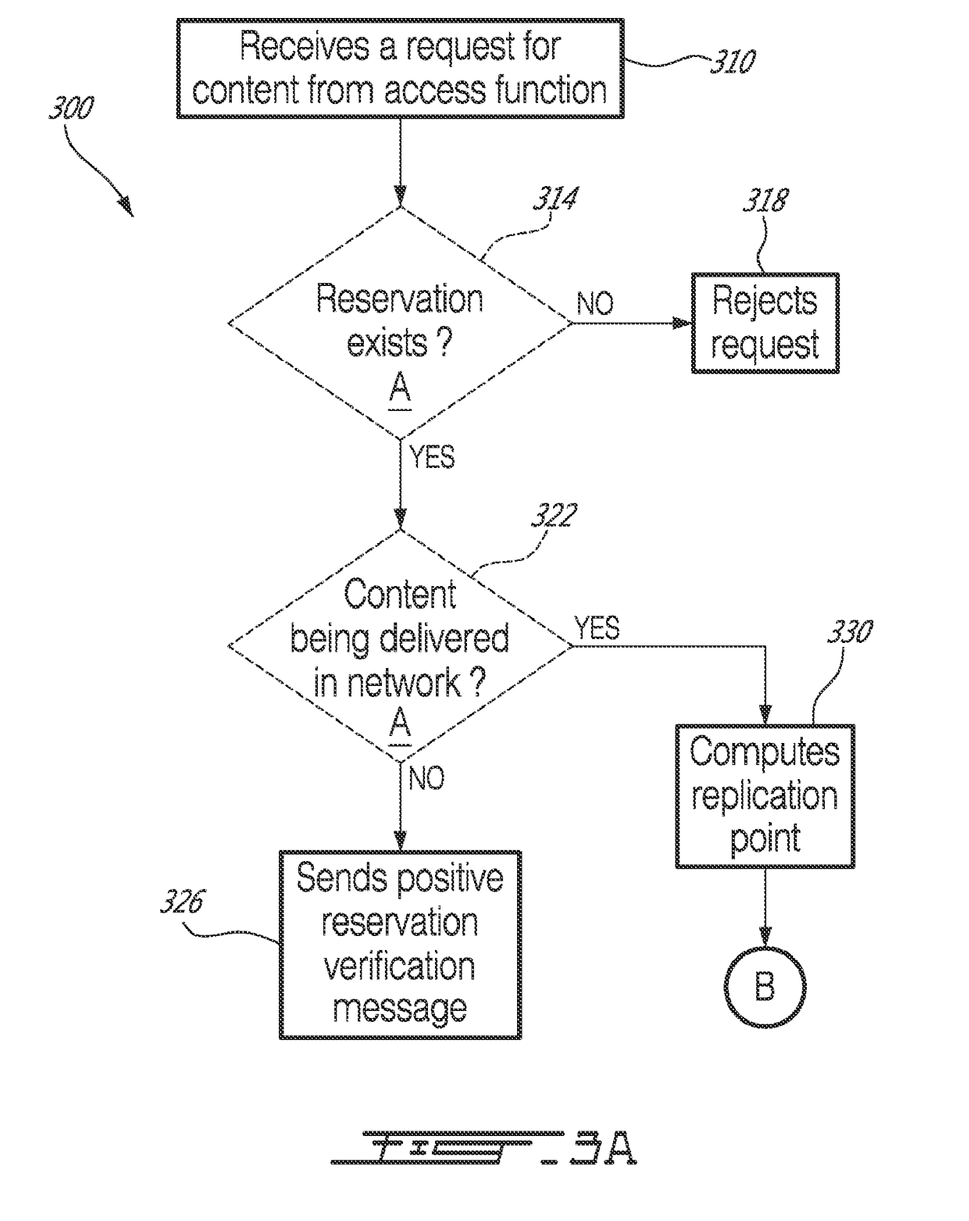
FIGS. 3A and 3B together referred to as FIG. 3 is an exemplary flowchart of a Resource Admission Control Entity's behavior in accordance with the teachings of the present invention.
Figure 3B:
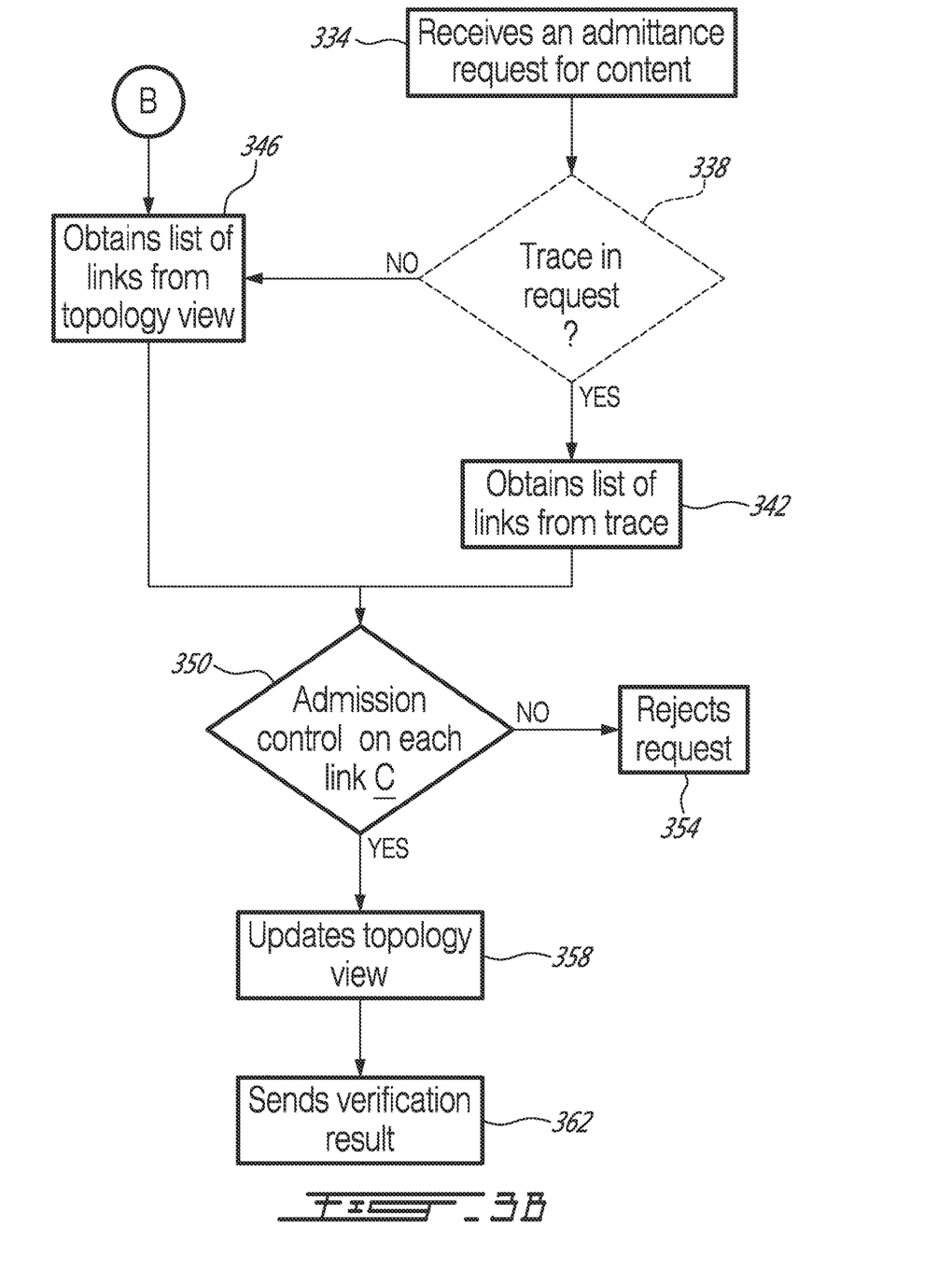
Figure 4:
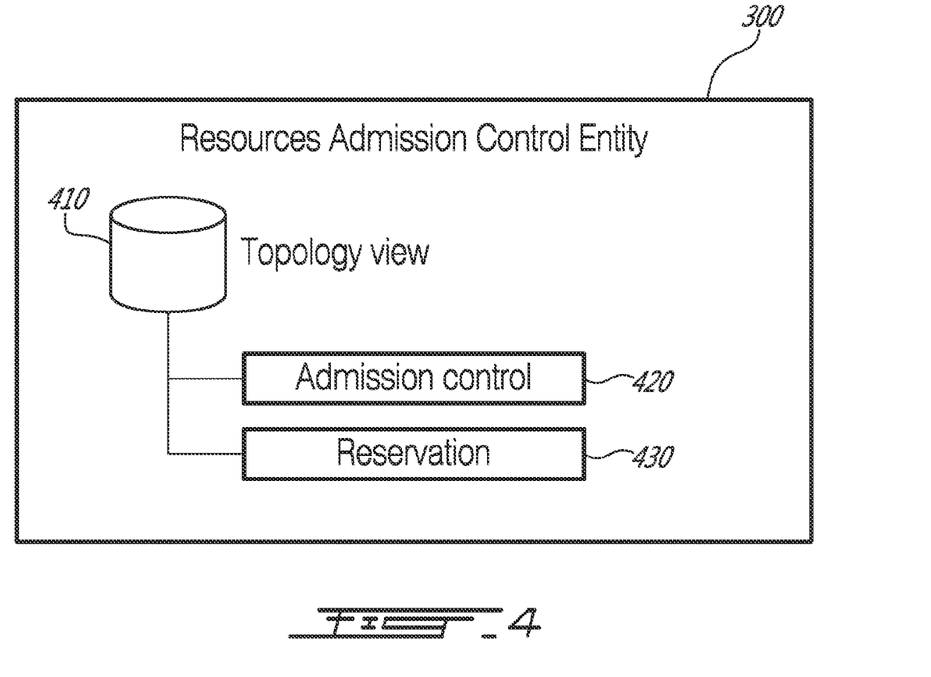
FIG. 4 is an exemplary modular representation of a Resource Admission Control Entity in accordance with the teachings of the present invention.

FIGS. 3A and 3B together referred to as FIG. 3 is an exemplary flowchart of a Resource Admission Control Entity's 300 behavior in accordance with the teachings of the present invention. FIG. 4 shows an exemplary modular representation of a Resource Admission Control Entity 300 in accordance with the teachings of the present invention. Reference is now made concurrently to FIGS. 3 and 4. The Resource Admission Control Entity 300 manages a network represented by an up-to-date topology view 410. The network can also be seen as an Administrative Domain (AD). The Resource Admission Control Entity 300 has an Admission Control module 420 that manages admission control into the network. A Reservation module 430 of the Resource Admission Control Entity 300 is responsible for managing reservation of content delivery on the network.

The Resource Admission Control Entity 300 receives a request for content 310 related to a user device from one of the node that regulates access to the network (otherwise known as access function). The Resource Admission Control Entity 300, via its Reservation module, may then verify if a reservation exists for the user device (e.g., last mile) 314. The reservation verification can be a simple verification of internal records of the Resource Admission Control Entity 300. It may also involve, for instance, contacting a further node (not shown). If there is no reservation for the user device, the request 310 is rejected (318).

If the reservation exists (or if the reservation verification was unnecessary), the Resource Admission Control Entity 300 may then verify 322 if the requested content is already being delivered in the network. This delivery verification 322 can be, for instance, a lookup of the existing delivery in the topology view (if such information is maintained) or consist of analysis of the multicast tree structure (if such information is maintained), etc. The Resource Admission Control Entity 300 may further maintain a delivery listing (not shown) for that purpose. If the delivery verification 322 shows that the content is not currently being delivered in the network, then the Resource Admission Control Entity 300, via its Reservation Module 430, sends a positive reservation verification result message 326 to the requesting access function if it is determined that the capacity exists to deliver the requested content. If the delivery verification 322 shows that the content is currently being delivered in the network, then the Resource Admission Control Entity 300 computes, based on the received request 310, a replication point of the content in the network 330. This is achieved by comparing the request 310 against the topology view. This results in the determination of the replication point and determination of a route that the requested content will have to be delivered through in the network. Once the replication point is determined, the Resource Admission Control Entity 300 needs to proceed with admittance of the content via its Admission Control module 420. The necessary steps are discussed below.

If the Resource Admission Control Entity 300 sent a positive reservation verification result message 326 to the requesting access function, there is no other active step to be taken apart from waiting for an admittance request 334 for the same content. Such an admittance request 334 is, in typical situation, received from an edge function of the network. The Admission Control module 420 of the Resource Admission Control Entity 300 then verifies if the admittance request 334 contains a trace 338 of the links to be used in the network for content delivery. If the trace exists, the Admission Control module 420 of the Resource Admission Control Entity 300 derives the list of links to be newly used for the content delivery directly therefrom 342. If there is no trace in the admittance request or if the content is known to be available in the network (from step 330), then the list of links to be newly used for the content delivery is derived by analyzing the topology view 410 of the network. In such a case, the Admission Control module 420 of the Resource Admission Control Entity 300 knows how the original content request shall be routed in the network based on the topology view 410 and can therefore base the list of links to be newly used for the content delivery thereon.

Once the list of links to be newly used for the content delivery is established, the Admission Control module 420 of the Resource Admission Control Entity 300 proceeds with admitting the content on each such link (350). This is achieved by making sure there is enough bandwidth (also considering any other agreed QoS parameters) on each link for the content to be delivered in accordance with the original request. If the content cannot be admitted on any of the listed link, the request 334 (or 310) is rejected 354. A message to this affect may be issued to the requestor. If, on the other hand, the content can be admitted on each listed link, the Admission Control module 420 of the Resource Admission Control Entity 300 proceeds with updating the topology view 410 (358) to reflect the new content being delivered in the network via the previously established list of links to be newly used for the content delivery. The Resource Admission Control Entity 300 thereafter informs the requestor of the positive outcome (access function if the content already locally delivered or edge function otherwise).

It should be readily understood that the foregoing description represents only a few of the contexts in which the present invention can be used. For instance, the number of concurrent delivery and requests in an actual network is expected to be high even though only one such request and delivery was shown in the drawings. Similarly, only three user devices were shown connected it a single access node whereas an actual network would comprise hundreds of such devices connected via multiple access nodes.

What is claimed is:

1. A resource admission control entity in an administrative domain (AD) of an IPTV network, the resource admission control entity having a topology view of the AD which includes link capacity information and link usage, the resource admission control entity having an admission control module, located in a network, the admission control module comprising:
   a network interface for receiving a request intended for a user to obtain a multicast content;
   a processor for:
      verifying that a reservation of the content exists for the user;
      deriving a list of links to be newly used by the multicast content based on the request and the topology view;
      verifying that the multicast content can be admitted on the links to be newly used by the multicast content based on the topology view thereby providing an admittance verification result; and
      if the admittance verification result is positive, updating the link capacity information and link usage in the topology view for the links to be newly used by the multicast content, wherein the updated link capacity information of the topology view comprises remaining link capacity;
   wherein the request is received from an Edge Router (ER) of the AD and comprises the list of links to be newly used in the AD to transit the multicast content and wherein deriving a list of links to be newly used by the multicast content further comprises obtaining the list by reading the list in the request.

2. The resource admission control entity of claim 1 wherein the admission control module further sends a reply to the request based on the admittance verification result.

3. The resource admission control entity of claim 1 wherein, if the admittance verification result is negative, the admission control module avoids modification to the link capacity information and link usage in the topology view.

4. The resource admission control entity of claim 1 wherein the request is received from an Access Node (AN) of the AD and wherein deriving the list of links to be newly used by the multicast content further comprises computing a point of replication of the multicast content based on the topology view thereby obtaining the list.

5. The resource admission control entity of claim 4 further comprising a reservation module that, prior to computing a point of replication by the admission control module:
   verifies if a reservation exists for the user in the AD thereby providing a reservation verification result; and
   wherein the reply to the request is based on the admittance verification result and further based on the reservation verification result.

6. The resource admission control entity of claim 5, wherein the reply comprises:
   a positive admission answer if the reservation verification result and admittance verification result are positive; and
   a negative admission answer if one of the reservation verification result and admittance verification result is negative.

7. The resource admission control entity of claim 1 that:
   receives topology configuration information for the topology view via at least one of a dynamic topology discovery protocol and a graphical user interface; and
   updates the topology view.

8. A method for admitting transition of a multicast content in an administrative domain (AD) of an IPTV network, comprising:
   in a resource admission control entity for the AD, receiving a request intended for a user to obtain the multicast content;
   in the resource admission control entity, verifying that a reservation of the content exists for the user;
   in the resource admission control entity, deriving a list of links to be newly used by the multicast content based on the request and a topology view of the AD;
   in the resource admission control entity, verifying if the multicast content can be admitted on the links to be newly used by the multicast content based on the topology view thereby providing an admittance verification result, wherein the topology view comprises link capacity information and link usage; and
   if the admittance verification result is positive, in the resource admission control entity, updating the link capacity information and link usage in the topology view for the links to be newly used by the multicast content, wherein the updated link capacity information of the topology view comprises remaining link capacity;
   wherein the request is received from an Edge Router (ER) of the AD and comprises the list of links to be newly used in the AD to transit the multicast content and wherein deriving a list of links to be newly used by the multicast content further comprises obtaining the list by reading the list in the request.

9. The method of claim 8 further comprising, from the resource admission control entity, sending a reply to the request based on the admittance verification result.

10. The method of claim 8 wherein the step of receiving the request is performed by receiving the request from an Access Node (AN) of the AD and wherein the step of deriving the list of links to be newly used by the multicast content further comprises computing a point of replication of the multicast content based on the topology view thereby obtaining the list.

11. The method of claim 8 further comprising a step of verifying if a reservation exists for the user in the AD thereby providing a reservation verification result.

* * * * *